ously linear function of speed, a switch ($Q_1$) is employed to provide a step change in attenuation at 40% of speed.

United States Patent [19]
Dolland et al.

[11] 4,401,934
[45] Aug. 30, 1983

[54] ADAPTIVE CONTROL SYSTEM FOR LINE-COMMUTATED INVERTERS

[75] Inventors: Carlisle R. Dolland; David A. Bailey, both of Torrance, Calif.

[73] Assignee: The United States of America as represented by the Administrator of the National Aeronautics and Space Administration, Washington, D.C.

[21] Appl. No.: 291,132

[22] Filed: Aug. 7, 1981

[51] Int. Cl.³ .............................................. H02P 5/40
[52] U.S. Cl. .................................. 318/798; 318/685; 318/806
[58] Field of Search ............... 318/798, 803, 685, 696, 318/806

[56] References Cited

U.S. PATENT DOCUMENTS

| | | | |
|---|---|---|---|
| 3,619,749 | 11/1971 | Schieman | 318/798 |
| 4,112,339 | 9/1978 | Lipo | 318/798 |
| 4,137,489 | 1/1979 | Lipo | 318/722 |
| 4,264,853 | 4/1981 | Morishita | 318/805 |
| 4,335,343 | 6/1982 | Dreiseitl et al. | 308/798 |

Primary Examiner—David Smith, Jr.
Attorney, Agent, or Firm—Joseph H. Beumer; John R. Manning; Leon D. Wofford, Jr.

[57] ABSTRACT

A control system for a permanent-magnet motor (10) driven by a multiphase line-commutated inverter (12) is provided with integrators (24) for integrating the back EMF of each phase of the motor for use in generating system control signals for an inverter gate logic (30) using a sync and firing angle ($\alpha$) control generator (26) connected to the outputs of the integrators. A precision full-wave rectifier (16) provides a speed control feedback signal to a phase-delay rectifier (14) via a gain and loop compensation circuit (20) and to the integrators for adaptive control of the attenuation of low frequencies by the integrators as a function of motor speed, whereby as the motor speed increases, the attenuation of low frequency components by the integrators is increased to offset the gain of the integrators to spurious low frequencies. While the attenuation may be a continuous linear function of speed, a switch ($Q_1$) is employed to provide a step change in attenuation at 40% of speed.

4 Claims, 3 Drawing Figures

ADAPTIVE CONTROL SYSTEM FOR LINE-COMMUTATED INVERTERS

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to a control system for a permanent-magnet motor driven by line-commutated inverter, and more particularly to an adaptive high-pass filter network for use in such a control system to condition back EMF signals utilized to generate inverter control signals.

In some applications, a permanent-magnet (PM) motor is controlled by a line-commutated inverter driven by a dc source comprised of a phase delay rectifier (PDR). The PDR rectifies the 3-phase power from a utility line and delivers the resulting dc current to the inverter over a dc link choke. The dc link choke is designed to provide a smooth current source for the line-commutated inverter. The inverter provides the necessary current to the motor windings.

A motor speed loop is closed around the inverter control, and a change in required speed results in a change in the PDR firing angle. This in turn changes the dc link current, and hence the motor speed. It is possible to vary the current in the dc link from zero to a maximum by adjusting the firing angle of the PDR in response to a gain and loop compensated error signal, where the error is the difference between a speed command signal and a signal proportional to the speed of the motor generated by precision full-wave rectification of the motor back EMF.

The back EMF is also utilized to generate the inverter control signals. Due to commutation overlap in the inverter, the back EMF is distorted. By integrating the back EMF, constant control sinusoidal waveforms devoid of distortion and in phase with the motor line-to-neutral voltage is obtained. However, the integrators provide much more gain to spurious low frequencies than the actual operating frequency. These spurious low-frequency fluctuations are caused by modulation between the PDR ripple and the back EMF frequency. At high motor speeds, these low-frequency fluctuations modulate the motor speed and are further reinforced by the integrators. Thus, in order to operate a line-commutated permanent-magnet motor at high speed, these low-frequency components must be filtered. A single high-pass filter, however, introduces undesirable phase shifts which result in poor motor power factors. The filter break (corner) frequency must be selected such that the phase shift does not cause excessive change in the power factor. It has been found that any single zero location that results in acceptable poer factors will not adequately eliminate low-frequency noise at all speeds. Consequently, there is a need for a high-pass filter whose break frequency can be changed as a function of speed so that adequate low-frequency filtering and system power factors can be obtained at all motor speeds.

SUMMARY OF THE INVENTION

In accordance with the present invention, adaptive high-pass filters are provided for integrators in a control system for a permanent-magnet motor driven by a line-commutated inverter to integrate the back EMF of each phase of the motor for use in generating system control signals. Each integrator is comprised of a high-pass filter, the corner frequency of which is shifted successively away from the $J\omega$ axis as the speed of the motor increases, whereby the attenuation of low-frequency components by the integrators is increased as the motor speed increases to offset the gain of the integrators to spurious low frequencies so that at all speeds the desired minimum power factor is assured. In the simplest form of the invention, two or more filter networks are provided for each back EMF phase and selectively switched into operation in the integration process as a function of motor speed.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
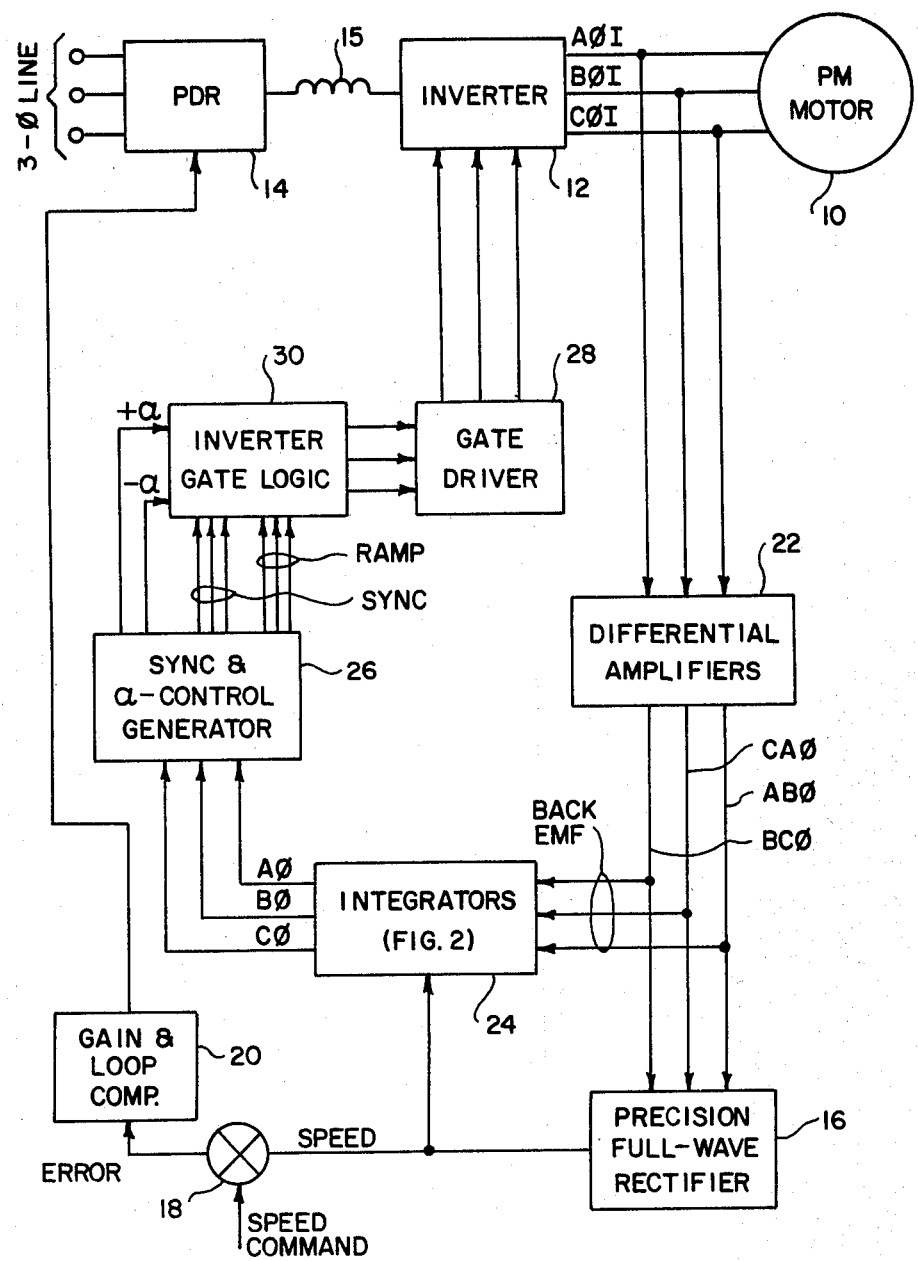
FIG. 1 is a block diagram of a control system for a permanent-magnet motor driven by a line-commutated inverter in which the present invention is utilized.

Referring to FIG. 1 of the drawings, a permanent-magnet (PM) motor 10 is shown controlled by a line-commutated inverter 12 that is driven by a phase delay rectifier (PDR) 14. The latter rectifies power from a 3-phase utility line and delivers the resulting dc current to the inverter through a dc link choke 15. While the motor speed is brought up to about 15% of its maximum, the necessary current to the motor windings is synchronized by conventional means (not shown). Once 15% speed is reached, sufficient back EMF can be sensed on the inverter output lines. These back EMF signals are rectified and combined in a precision full-wave rectifier 16 to provide a dc signal proportional to the motor speed. This speed signal is then compared with a dc speed command signal at a comparator 18 to provide an error signal that is applied to the PDR through a gain and loop compensation circuit 20. In that manner, a motor speed loop is closed around the line-commutated control system for the motor which embodies the invention that will now be described.

The back EMF is also utilized to generate the control signals for the line-commutated inverter 12, but due to commutation overlap, the back EMF is distorted. To obtain constant control sinusoidal waveforms devoid of distortion, and in phase with the motor line-to-neutral voltage, the back EMF signals $BC\phi$, $CA\phi$ and $AB\phi$ from differential amplifiers 22 are conditioned by a set of three integrators represented by a single block 24. The differential amplifiers produce sinusoidal signals that are equal to the difference between the back EMFs A, B and C of the phases indicated in pairs as follows:

$$AB\phi = A - B$$

$$BC\phi = B - C$$

$$CA\phi = C - A$$

The outputs of these integrators are utilized to obtain information for generating the firing angles for all three phases of the inverter, $A\phi I$, $B\phi I$ and $C\phi I$. This information is obtained through a sync and $\alpha$-control generator 26 which then generates the gate firing pulses for inverter gate drivers 28 through inverter gate logic 30.

The integrators 24 provide lower gain to spurious low frequencies than the actual operating frequency. These spurious low-frequency fluctuations are caused by modulation of the PDR ripple frequency with the back EMF frequency. These low-frequency components at high motor speds are reinforced by the integrators, consequently low frequency filtering is required. This is accomplished, according to this invention (without introducing undesirable phase shifts, which result in poor power factors for the motor) by adaptive control of the break (corner) frequency of high-pass filters at the inputs of the integrators as a function of speed so that adequate low-frequency filtering and system power factors can be obtained at all motor speeds.

Figure 2:
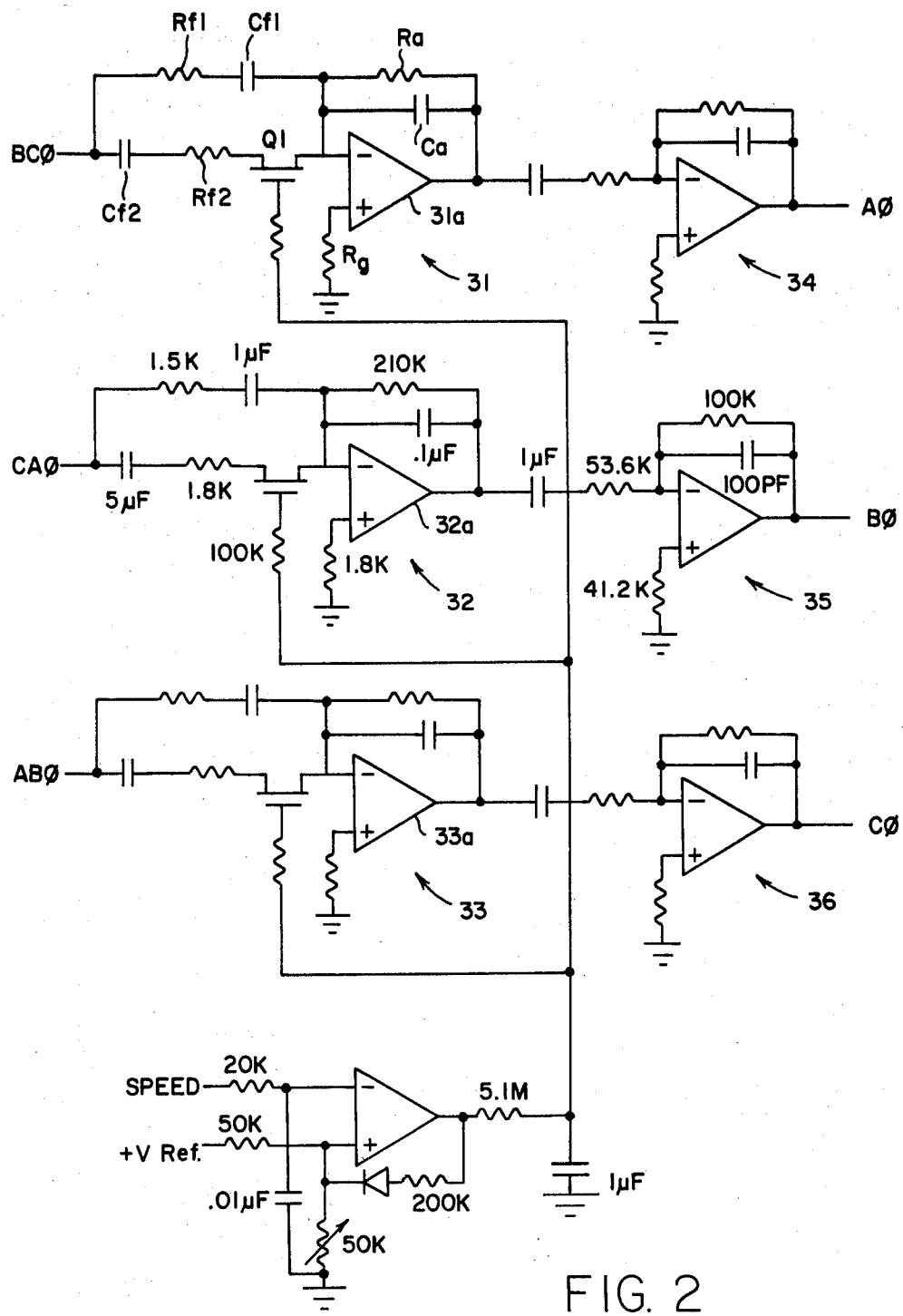
FIG. 2 is a schematic diagram of exemplary integrators in the system of FIG. 1.

FIG. 2 illustrates an embodiment of this adaptive control in its simplest form. It is comprised of three integrators 31, 32 and 33 for the respective back EMF signals $BC\phi$, $CA\phi$ and $AB\phi$. Each integrator is comprised of an operational amplifier with a feedback (integrating) capacitor $C_a$ and resistor $R_a$ in parallel, such as an operational amplifier 31a utilized to condition back EMF signal $BC\phi$. The noninverting input terminal is connected to circuit ground through a resistor $R_g$. The outputs of the operational amplifiers 31, 32 and 33 are ac coupled to amplifiers 34, 35 and 36 to remove the dc component caused by the offset voltage of the amplifiers 31, 32 and 33 and the high dc gain of these integrator stages. These amplifiers also invert the integrator outputs to provide the signals $A\phi$, $B\phi$ and $C\phi$ which are in phase with the line-to-neutral back EMF waveforms.

The back EMF inputs to the integrators are essentially sinusoidal. Distortions in the inputs due to commutation overlap are eliminated by the filtering action of the integrators, and at low motor speed, spurious low-frequency fluctuations (caused by modulation between the PDR ripple frequency present in the inverter outputs and the back EMF frequency) are eliminated by including a high-pass filter at the input of each of the amplifiers 31a, 32a and 33a. In this embodiment of the invention in its simplest form, these filters are comprised of two parallel branches, one comprised of a resistor Rf1 in series with a capacitor Cf1 is fixed, and the other comprised of a resistor Rf2 in series with a capacitor Cf2 is connected in parallel with the fixed branch by a conducting FET switch $Q_1$.

As noted hereinbefore, the integrators provide undesired gain to spurious low frequencies which, unless filered, will cause low-frequency fluctuations in the motor speed. Because of the closed loop control of the line-commutated inverter, these low-frequency fluctuations increase in amplitude, resulting in regenerative feedback of the spurious low frequencies in the back EMF. Consequently, for low speeds, these spurious low frequencies are filtered out by the two parallel high-pass filter branches functioning with the operational amplifier and integrating capacitor as a single high-pass filter with a break frequency so selected that phase shift does not cause any excessive reduction in the power factor.

Figure 3:
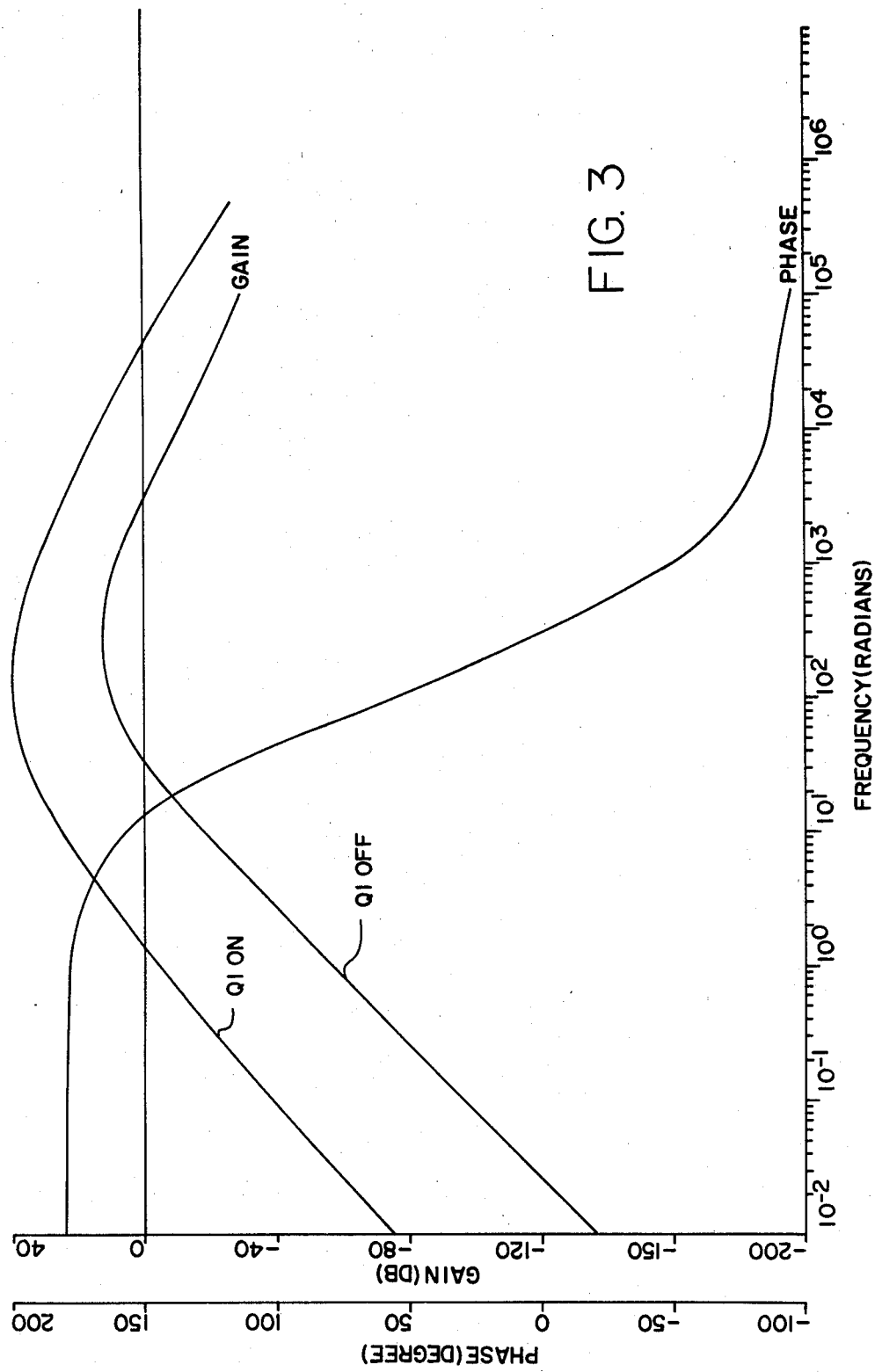
FIG. 3 is a plot of the gain and phase of each integrator of FIG. 2 before and after switchover from one high-pass filter configuration to another as a function of speed.

However, a single zero location that results in acceptable power factors at low speeds will not adequately eliminate low-frequency noise at high speeds. The filters are therefore made adaptive by the inclusion of the FET switches in one branch so that, at high speeds, that branch may be eliminated by simply turning off the transistor. The break or corner frequency of the filters are shifted away from the $j\omega$ axis when the switches are turned off. The result is that gain as a function of phase is decreased at high speed once the transistors are turned off. FIG. 3 shows a graph of gain as a function of frequency with the FET switch on at low speeds and a plot of gain with the FET switch off at high speeds. Also plotted is a graph of phase shift as a function of frequency.

The FET switches are controlled by the output of a comparator 37 which compares the motor speed signal with a reference. When the reference is exceeded, the output of the comparator switches from a positive voltage to a negative voltage to turn the FET switches off. In that manner, as the speed increases above some predetermined reference, such as 40%, the low-frequency components of the back EMF signals are subjected to high attenuation by switching out one of the parallel branches of the filter. It is evident that more than two parallel branches may be included in each filter, with more than two comparators, to switch successive branches out at successively higher motor speeds, or that a plurality of filters be otherwise provided with break frequencies shifted sequentially away from the $j\omega$ axis, with means for switching into operation the successive filters as the speed of the motor increases. Still other ways of achieving a speed-adaptive filter for each integrator will occur to those skilled in the art.

It should be noted that as the motor speed increases, and the gain of the integrators decreases, the output amplitude of the integrators also changes. Consequently, this concept of an adaptive filter for the integrators cannot be utilized in a conventional line-commutated inverter since the outputs of the integrators are compared to a constant voltage for the purpose of generating firing angle control signals, so that any change in amplitude represents a change in the operating power factor of the system. Thus, the line-commutated inverter must be made immune to any amplitude fluctuations on the back EMF or the filtered back EMF. One technique for providing such immunity is disclosed in the a copending application filed concurrently entitled "ADAPTIVE REFERENCE VOLTAGE GENERATOR FOR FIRING ANGLE CONTROL OF LINE-COMMUTATED INVERTERS" which is incorporated herein by reference for the purpose of showing utility of the present invention. Briefly, if the integrated line-to-neutral back EMF waveforms $A\phi$, $B\phi$ and $C\phi$ are compared in pairs to generate square sync waveforms as follows:

$$A\phi \text{ SYNC} = A\phi > B\phi$$

$$B\phi \text{ SYNC} = B\phi > C\phi$$

$$C\phi \text{ SYNC} = C\phi > A\phi$$

The leading edges of these waveforms occur at the time where positive halves of the integrated back EMF waveforms are maximum. These leading edges are therefore used to sample and hold the amplitude of the highest back EMF waveform. The sample is used over the next 120° to control the reference voltage with which the integrator outputs are compared in generating the firing angle control signals for the inverter.

Although particular embodiments of the invention have been described and illustrated herein, it is recognized that modifications and variations may readily occur to those skilled in the art. Consequently, it is intended that the claims be interpreted to cover such modifications and equivalents.

What is claimed is:

1. In a control system for a permanent-magnet motor driven by a multiphase line-commutated inverter, said control system having means for integrating the back EMF of each phase of said motor for use in generating system control signals for said inverter, an improvement comprising
    means for generating a signal proportional to motor speed, and
    adaptive means responsive to said motor speed signal for increasing the attenuation of low frequencies in the back EMF of each phase of said motor by said integrating means as said motor speed increases.

2. An improvement as defined in claim 1 wherein said adaptive means is comprised of electronic switches and filter circuits at the input of said integrating means for selectively altering connections of said filter circuits to so alter filter configurations as to shift the corner frequency of said integrating means away from the $j\omega$ axis thereof as the speed of the motor increases.

3. An improvement as defined in claim 2 wherein said filter circuits for each EMF signal are comprised of an operational amplifier with an integrating capacitor for each EMF signal and at least two high-pass filters, a first one permanently connected to couple said EMF signal to said operational amplifier for integration and a second one connected in parallel with said first one by one of said electronic switches.

4. In a control system for a permanent-magnet motor driven by a line-commutated inverter, a separate integrator having an adaptive high-pass filter for use in generating system control signals for said inverter from back EMF of said motor, and means for generating a signal proportional to motor speed, and means responsive to said signal for shifting the corner frequency of the high-pass filter of each integrator away from the $j\omega$ axis as the speed of the motor increases, whereby the attenuation of low-frequency components in said back EMF by the integrators is increased as the motor speed increases to offset the gain of the integrators to spurious low frequencies, thereby assuring a desired minimum power factor at all speeds.

* * * * *